United States Patent [19]

Hooykaas

[11] Patent Number: 5,429,751
[45] Date of Patent: Jul. 4, 1995

[54] METHOD FOR IMMOBILIZING MATERIAL CONTAMINATED WITH HEAVY METAL IONS, A FIXANT FOR IMMOBILIZING HEAVY METAL IONS AND A MATRIX

[75] Inventor: Carel W. J. Hooykaas, Rotterdam, Netherlands

[73] Assignee: Pelt & Hooykaas B.V., Netherlands

[21] Appl. No.: 293,548

[22] Filed: Aug. 22, 1994

[30] Foreign Application Priority Data

Sep. 7, 1993 [NL] Netherlands ............... 9301546
Dec. 6, 1993 [NL] Netherlands ............... 9302114

[51] Int. Cl.⁶ ............... C02F 1/62; C02F 11/14
[52] U.S. Cl. ............... 210/751; 210/912
[58] Field of Search ............... 210/751, 912, 913, 914

[56] References Cited

U.S. PATENT DOCUMENTS

| | | | |
|---|---|---|---|
| 3,841,102 | 10/1974 | Cinner et al. | 210/751 |
| 4,659,511 | 4/1987 | Fukasawa et al. | 210/751 |
| 4,844,815 | 7/1989 | Ader et al. | 210/751 |
| 4,948,516 | 8/1990 | Fisher et al. | 210/751 |
| 5,238,583 | 8/1993 | Fortson | 210/751 |
| 5,259,975 | 11/1993 | Mohn | 210/751 |
| 5,264,135 | 11/1993 | Mohn | 210/751 |
| 5,372,729 | 12/1994 | Hooykaas | 210/751 |
| 5,376,283 | 12/1994 | Hooykaas | 210/751 |

*Primary Examiner*—Neil McCarthy
*Attorney, Agent, or Firm*—Levine & Mandelbaum

[57] ABSTRACT

A method for immobilizing material contaminated with heavy metal ions, a fixant for immobilizing heavy metal ions and a matrix.

A method is disclosed for immobilizing material contaminated with heavy metal ions, said metal ions in a liquid environment being allowed to react with a metal-complexing agent with the formation of a metal complex, the metal-complex formed being mixed, in the presence of water, with an inorganic, hydraulic binder comprising blast furnace slag cement, fly ash cement or a combination thereof to form a matrix having reductive properties in the form of a hard, rocklike material, which method is characterized in that said metal complex is formed in the presence of a metal-complex bond activator. Said metal-complex bond activator is preferably a water-soluble salt of a transition metal element, expediently ferric chloride or manganese sulphate. The invention also relates to a fixant for immobilizing heavy metal ions comprised in waste material, and to a matrix to be formed from a material contaminated with heavy metal ions.

7 Claims, No Drawings

METHOD FOR IMMOBILIZING MATERIAL CONTAMINATED WITH HEAVY METAL IONS, A FIXANT FOR IMMOBILIZING HEAVY METAL IONS AND A MATRIX

BACKGROUND OF THE INVENTION

The invention relates to a method for immobilizing material contaminated with heavy metal ions, said metal ions in a liquid environment being allowed to react with a metal-complexing agent with the formation of a metal-complex, the metal-complex formed being mixed, in the presence of water, with an inorganic, hydraulic binder comprising blast furnace slag cement, fly ash cement or a combination thereof to form a matrix having reductive properties in the form of a hard, rocklike material.

DISCLOSURE OF THE PRIOR ART

A method for immobilizing material contaminated with inorganic toxic compounds and elements is known from EP-A-0 535 758. To form a metal complex, the trimercapto-S-triazine trisodium salt is used in this known process.

Incidentally, the use of mercapto-S-triazine salts for removing noxious metals from wastewater is known per se from the French Patent No. 2,149,546. This publication, however, exclusively teaches the possibility of removing metals from a waste stream, with the aid of a mercapto-S-triazine salt, by the formation of a precipitate. The problems which can arise if the precipitate formed is to be immobilized by incorporating it in a matrix of a hydraulic binder are not discussed here.

It was found, however, that adequate immobilization of material contaminated with metals, especially with heavy metals, was not always possible, notwithstanding the fact that the removal yield was good owing to the addition of such a complexing agent. The product obtained after setting then gave, in such cases, in various leaching tests, unacceptably high leaching values of the various constituents with the lapse of time.

It is assumed that this is a consequence of the fact that, in the metal complex formed, the bond of the metal ion is somewhat oxidation-sensitive and can therefore readily be broken, the metal ion in question being liberated in the process.

The complex formed is therefore mixed, in the presence of water, with an inorganic, hydraulic binder to form a matrix having reductive properties in the form of a hard, stonelike material.

Owing to the presence of a matrix having reductive properties, leaching of metal ions will be reduced after time has passed, because the oxidative behaviour which may be associated with leaching under natural conditions can at least partially be compensated for by such a matrix. The bond of the metal ions to the complexing agent therefore will mainly remain intact, as a result of which no leaching of metal can occur.

The inorganic hydraulic binder used is expediently a binder containing as the active phase ground, granulated blast-furnace slags; fly ash which may or may not be ground, or a combination thereof. A binder of this type proves to be able to form a matrix which has sufficiently reductive properties to be able to prevent possible oxidation of the metal complex.

Preferably, blast-furnace slag cement, fly ash cement or a combination thereof is used.

It should be noted in this context that Portland cement does not adversely affect the present method, because it has negligible reductive properties or none at all.

SUMMARY OF THE INVENTION

Surprisingly, it has now been found that, if the metal complex is formed in the presence of a metal-complex activator, the leaching values of various toxic heavy metals from a matrix in the form of a hard, stonelike material, formed with an inorganic hydraulic binder as mentioned above, can be improved even further.

The invention therefore relates to a method of the type mentioned in the preamble, which method is characterized in that the metal complex is formed in the presence of a metal-complex bond activator.

The method according to the invention is particularly suitable for immobilizing material contaminated with heavy metals, in particular with mercury, zinc, cadmium, lead, copper, antimony, chromium, cobalt, selenium, silver, nickel, strontium and molybdenum.

The metal-complex bond activator used is preferably a salt of a transition metal element.

The water-soluble iron, manganese and aluminium salts, on their own or as mixtures thereof are preferred as metal-complex bond activators in the present method.

Although the reaction mechanism is not entirely clear, and Applicant would not wish to be committed to a particular theory, a possible explanation for the effect observed would be as follows.

Trimercapto-S-triazines have ring-like, aromatic structures which may produce interaction between the electron-rich $\pi$ orbitals of the aromatic structures and the empty d orbitals of the metal ions. Thus, in the present case, a fairly flat trimercaptotriazine ion, for example, could be surrounded by one or more iron and/or manganese ions. The reaction pattern of such a complex is difficult to predict a priori; it is known, however, from organometallic chemistry that such complexes can have increased activity.

It is also conceivable, however, that an iron or manganese ion binds to a terminal thiol group of the trimercapto-S-triazine and thus produces a more reactive compound.

The medium containing the complex formed according to the invention is preferably also admixed with a setting catalyst. The addition of a setting catalyst results in the possibility of setting being accelerated, and a set material being obtained which has adequate compression strength and low permeability.

Preferably, the setting catalyst used is sodium chloride or sodium sulphate.

It should be noted that, to form a matrix on the basis of the abovementioned hydraulic binders, the addition of an acidic or alkaline composition is not always necessary and may sometimes even be dispensed with, because the binders apparently form a structure, of such a type during setting, that sufficiently reductive properties still remain present therein. The addition of, for example, an alkaline composition is only necessary if the contaminated material to be immobilized has such a strongly acidic character that setting into a stonelike material after the addition of a hydraulic binder is not possible.

Advantageously, 20–40% by weight, preferably 30% by weight of inorganic hydraulic binder, based on the weight of the contaminated material to be immobilized, is used. These amounts must obviously not be regarded as limiting. If desired, different amounts can be used to obtain the desired matrix.

The amount used of the bond activator, therefore preferably iron chloride and/or its sulphate, and/or manganese sulphate, is, in particular, 1–10% by weight, preferably 3–5% by weight, based on the weight of the contaminated material to be immobilized, whereas the amount used of the complexing agent expediently is 0.1–5% by weight, likewise based on the weight of the material to be immobilized.

The invention further relates to a fixant for immobilizing heavy metals comprised in waste material at least comprising a metal-complexing agent and an inorganic hydraulic binder selected from the group consisting of blast furnace slag cement, fly ash cement, or a combination thereof, and further comprising a metal-complex bond activator.

As explained above, the presence of a metal-complex bond activator results in a stronger bond between the metal ion to be immobilized and the complexing agent, and thus results in lower leaching values in leach tests.

The metal-complex bond activator is preferably a salt of a transition metal element, expediently selected from the group consisting of the water-soluble iron, manganese, and aluminium salts, and mixtures of these compounds.

In a further preferred embodiment, the present fixant also comprises a setting catalyst, which is expediently sodium chloride or sodium sulphate.

A fixant which has been found to be very expedient in practice, consists, more in particular, of 10–60% by weight of Portland cement; 10–50% by weight of blast-furnace slag cement; 0.1–10% by weight of trisodium trimercapto-S-triazine; 1–15% by weight of ferric chloride and/or manganese sulphate.

The invention also relates to a matrix to be formed from a material contaminated with heavy metal ions, a metal complexing agent, a metal-complex bond activator and a inorganic hydraulic binder selected from the group consisting of blast furnace slag cement, fly ash cement or a combination thereof.

The heavy metals to be incorporated in said matrix are preferably selected from the group consisting of mercury, zinc, cadmium, lead, copper, antimony, chromium, cobalt, selenium, silver, nickel strontium and molybdenum, whereas the metal-complex bond activator consists preferably of ferric chloride, ferric sulphate, manganese, sulphate, aluminium sulphate, or a mixture of these compounds.

Other claims and many of the attendant advantages will be more readily appreciated as the same becomes better understood by reference to the following detailed description.

DESCRIPTION OF THE PREFERRED EMBODIMENTS

EXAMPLE 1

Starting from a filter cake, containing 6% of zinc, 1.5% of lead and 0.5% of cadmium, this was treated in the following ways:

a. with 19% of Portland cement, 16% of blast-furnace slag cement and 1.92% of trisodium trimercapto-S-triazine salt;
b. with 19% of Portland cement, 16% of blast-furnace slag cement and 5% of ferric chloride and manganese sulphate;
c. with 19% of Portland cement, 16% of blast-furnace slag cement, 5% of ferric chloride and manganese sulphate, and 1.92% of trisodium trimercapto-S-triazine salt.

After setting for 1 month, under completely identical conditions, the products obtained were subjected to a leaching test (diffusion test), in which the following results were obtained:

| Element | Cumulative leaching in mg/m$^2$ | | |
|---|---|---|---|
| | a | b | c |
| Lead | 1.629 | 7.764 | n.d. |
| Cadmium | 0.547 | 0.640 | n.d. |
| Zinc | 12.840 | 6.784 | 0.778 |

These leaching values clearly show the particularly beneficial effect of the material treated according to c).

EXAMPLE 2

In this example, a waste material was used which, in addition to 1.4% of zinc and 0.5% of lead, also contained molybdenum in an amount of 25 mg/kg of dry matter and strontium in an amount of 15 mg/kg. This material was likewise treated in three ways:

a. with 12% of Portland cement, 10% of blast-furnace slag cement and 0.55% of trisodium trimercapto-S-triazine;
b. with 12% of Portland cement, 10% of blast-furnace slag cement and 3% of ferric chloride and manganese sulphate;
c. with 12% of Portland cement, 10% of blast-furnace slag cement, 3% of ferric chloride and manganese sulphate, and 0.55% of trisodium trimercapto-S-triazine salt.

After setting for 1 month, under completely identical conditions, the products obtained were subjected to a leaching test (column test), in which the following results were obtained:

| Element | Emission in mg/l of leachate | | |
|---|---|---|---|
| | a | b | c |
| Lead | 0.012 | 0.041 | n.d. |
| Zinc | 0.086 | 0.061 | 0.004 |
| Molybdenum | 7.4 | 23 | 0.7 |
| Strontium | 8.6 | 5.9 | 1.4 |

The results of the Examples 1 and 2 clearly show the particularly beneficial effect of a mixture of the triazine salt and iron chloride and/or manganese sulphate in combination with blast-furnace slag cement.

What is claimed is:

1. A method for immobilizing material contaminated with heavy metal ions, said metal ions in a liquid environment being allowed to react with a metal-complexing agent with the formation of a metal complex, the metal-complex formed being mixed, in the presence of water, with an inorganic, hydraulic binder comprising blast furnace slag cement, fly ash cement or a combination thereof to form a matrix having reductive properties in the form of a hard, rocklike material, wherein the metal complexing agent is a mercapto-S-triazine salt and said metal complex is formed in the presence of a metal-complex bond activator selected from the group consisting of water-soluble iron, manganese and aluminium salts, or a mixture thereof.

2. A method according to claim 1, wherein the mercapto-S-triazine salt is in the form of its trisodium salt.

3. A method according to claim 1, wherein a setting catalyst selected from the group consisting of sodium chloride and sodium sulphate is also used.

4. A method according to claim 1, wherein the immobilization is carried out in the absence of an additional supply of an acidic or alkaline agent.

5. A method according to claim 1, wherein 20–40% by weight of inorganic hydraulic binder, based on the weight of the contaminated material to be immobilized, is used.

6. A method according to claim 1, wherein 1–15% by weight of the metal-complex bond activator, selected from the group consisting of iron chloride, iron sulphate and manganese sulphate, based on the weight of the contaminated material to be immobilized, is used.

7. A method according to claim 1, wherein 0 1–10% by weight of the metal-complexing agent, based on the weight of the contaminated material to be immobilized, is used.

* * * * *